2,901,379

HIGH TEMPERATURE RESISTANT VITREOUS MATERIAL

Richard F. Shannon, Lancaster, and Robert H. Mitchell, New Concord, Ohio, assignors to Owens-Corning Fiberglas Corporation, Toledo, Ohio, a corporation of Delaware No Drawing. Application April 9, 1956
Serial No. 577,428

17 Claims. (Cl. 117—124)

This invention relates to a vitreous material resistant to high temperatures, and, more particularly, to a vitreous material in the form of fibers, flakes or the like having high temperature resistance by virtue of a coating thereon of a refractory metal oxide.

Fibers, flakes and similar shapes of a vitreous substance having a maximum dimension in at least one direction not greater than about 0.005 inch have many characteristics that make them highly advantageous for various uses. Service temperature is a condition which limits the use of such fibers, flakes and the like, which are usually made of glass. For example, glass fibers can be used to advantage in gasketing materials and pipe wraps, but are unsuited for use where service conditions involve temperatures above the softening point of the glass.

Various attempts have heretofore been made to treat glass fibers, flakes and the like, subsequent to their production, to produce treated materials effective under service conditions involving higher temperatures than the fibers or flakes themselves are capable of withstanding. For example, glass fibers have been coated with an aqueous dispersion of bentonite and dried. The resulting dried product has been found to be suitable for use under service conditions involving temperatures substantially above the softening temperature of the fibers. However, the drying of glass fibers coated with an aqueous dispersion of bentonite is a lengthy operation because of the high affinity of bentonite for water. Furthermore, the resulting product is relatively unsatisfactory because it is of a powdery nature. So far as is known, glass fibers or flakes coated with bentonite are no longer a standard article of commerce.

U.S. Patent 2,610,957 suggests the use of certain salts as binders to produce articles including glass fibers which can be used under service conditions involving temperatures above the softening point of the glass. The invention of this patent depends upon the relatively high solubility of primary salts of metals such as aluminum and polybasic acids such as phophoric acid, and the relatively low solubility of the corresponding secondary or tertiary salts. The manipulative steps involved in producing such binders include effecting a solution of the relatively soluble primary salt, but in proportions which will ultimately produce the relatively insoluble secondary or tertiary salt, impregnating glass fibers with the resulting solution, and heating the impregnated fibers to a temperature from about 250° F. to about 700° F. During this final heating volatile materials are driven off and the salt impregnant is converted to a binder which is the corresponding secondary or tertiary salt. The treated fiber, after drying, is coated with a relatively insoluble secondary or tertiary salt. In the case of tertiary aluminum phosphate ($AlPO_4$), the salt is high melting (above 1500° C.), so that the coated fiber is resistant to service temperatures substantially above the softening temperature of the glass of which the fiber itself is composed. The coated fiber, however, has certain properties, particularly a tendency to powdering from its surface and a harsh feel, which make it relatively unsatisfactory for many uses where its resistance to high temperatures would be advantageous.

The instant invention is based upon the discovery that a fiber, flake or other similar form of a vitreous substance having a maximum dimension in at least one direction not greater than about 0.005 inch can be made resistant to temperatures above the softening temperature of the vitreous substance by providing, adhered to at least one surface of the mass, a coating comprising at least one refractory metal oxide.

It is therefore, an object of this invention to provide an improved fiber, flake or similar mass of a vitreous substance having a maximum dimension in at least one direction not greater than about 0.005 inch.

It is a further object of the invention to provide an improved fiber, flake or the like resistant, by virtue of a coating, adhered to at least one surface thereof, of a refractory metal oxide, to temperatures above the softening temperature of the vitreous substance of which the fiber, flake or the like is composed.

It is still a further object of the invention to provide an improved fiber, flake or the like of a vitreous substance provided with a coating convertible to a refractory metal oxide coating.

Other objects and advantages will be apparent from the description which follows, which is intended only to illustrate and disclose, but in no way to limit, the invention.

According to the invention an improved article of manufacture is provided. Such article comprises a mass of a vitreous substance having a maximum dimension in at least one direction not greater than about 0.005 inch, and a coating adhered to at least one surface of the mass. The coating must constitute an appreciable percentage of the combined weight of vitreous substance and coating, and must include at least one refractory metal oxide having a pH not greater than 10.5 for its effect upon practical service temperature of the article to be appreciable.

The term "refractory metal oxide" is used herein, and in the appended claims, in its usual sense to refer to high melting metal oxides. To be considered refractory for purposes of the present invention a metal oxide should have a melting point not lower than 1000° C. In addition to being refractory, as is indicated above, a metal oxide present in a coating on an article according to the invention must have a pH not greater than 10.5; such metal oxide must also be one which does not form, with the glass or other vitreous substance, a different glass or other vitreous substance that is lower melting than the original vitreous substance. Examples of metal oxides suitable for such use, according to the invention, having a melting point of at least 1000° C., a pH not higher than 10.5, and which do not react with glass constituents to form lower melting glasses, include:

| | |
|---|---|
| $Fe_2O_3$ | NiO |
| $WO_3$ | CoO |
| $TiO_2$ | MnO |
| MgO | $SnO_2$ |
| $Al_2O_3$ | $CeO_2$ and other rare earth |
| $ZrO_2$ | oxides, either of type 4f or |
| $Cr_2O_3$ | type 5f |

Optimum results have been achieved where the coating included, as a refractory metal oxide, $Al_2O_3$, $ZrO_2$, $Fe_2O_3$, and $CaAl_2O_4$. In general, for reasons which will subsequently be explained in more detail, it is believed to be preferable that the refractory metal oxide be the oxide of a metal which forms a gelatinous insoluble hydroxide. Excellent results have also been achieved where the coating has included a mixture of two or more refractory metal oxides, preferably two spinel-forming metal oxides, most desirably in spinel proportions, and when one of the spinel-forming oxides has been alumina.

Significant raising of the effective service temperature of vitreous fibers, flakes and the like have been achieved by virtue of a refractory metal oxide coating thereon constituting as little as 10 percent of the combined weight of refractory oxide coating and vitreous substance. Optimum improvement has been achieved in most instances when the refractory metal oxide coating has constituted at least about 15 percent of the combined weight of vitreous substance and refractory oxide. So far as is known, there is no upper limit on the thickness or weight percentage of refractory oxide coating that can be used, apart from physical considerations. For example, an extremely thick coating would completely change the physical characteristics of glass fibers, flakes or the like carrying such coating, and the article would assume the characteristics of the coating, rather than those of the vitreous substance. Ordinarily, there is no reason for the coating of refractory metal oxide to constitute more than about 50 percent of the combined weight of vitreous material and coating. Preferred ranges, therefore, of refractory oxide coating are from 10 percent to 50 percent of the combined weight of vitreous material and coating, most desirably from 15 percent to 50 percent thereof.

A mass of vitreous substance having a maximum dimension in at least one direction not greater than about 0.005 inch and a refractory metal oxide coating adhered thereto can be produced merely by applying a water solution of a metal salt to the fibers, and converting the salt to the corresponding oxide. In some instances such conversion can be accomplished merely by heating. For example, a salt which is converted to the corresponding oxide by heat, such as aluminum sulphate, magnesium chloride, titanium oxysulphate ($TiOSO_4$), zirconium chloride, or the like, can be applied to glass fibers, and the resulting fibers dried. The dried fibers are resistant to temperatures above the softening temperature of the glass of which they are composed if the metal salt is present in sufficient amount to produce a refractory metal oxide coating constituting at least about 10 percent of the combined weight of glass and coating. In such case, the salt-coated fiber can be introduced directly into a Fisher burner flame, and will be found to be resistant to the temperature thereof for periods of time substantially longer than would be the uncoated fiber. It is believed that, in this instance, the metal salt is converted, by heat, to the refractory metal oxide which then provides the desired heat resistance. In such case it is not necessary to subject the coated article to a high temperature in order to produce the refractory metal oxide coating, as the fiber or the like can merely be fabricated into a finished article such as a pipe wrap or a high temperature gasket, and the final conversion of the metal salt coating to a refractory metal oxide coating need never occur if the particular product is never subjected to a sufficiently high service temperature. The metal salt coating is capable of such conversion at any time, and therefore provides a fiber or the like that is safe for use under service conditions where such temperatures may be encountered.

An appropriate metal salt coating on a glass fiber or the like can also be converted to the corresponding refractory metal oxide in another way, which is preferred in many instances. After application of the salt solution to the fiber or the like, and preferably while the salt coating is still at least damp, the fiber can be immersed in or otherwise treated with a suitable hydroxide solution, preferably an ammonium hydroxide solution, to produce the corresponding hydroxide. Such treatment results in a coated fiber, whether the metal salt used is thermally convertible to an oxide or not, on which the desired refractory metal oxide coating can be produced merely by heating. Such a procedure is particularly advantageous where, for example as in the case of iron salts and aluminum salts, a gelatinous hydroxide is precipitated upon treatment with ammonium hydroxide. Where gelatinous hydroxides are formed, the adherence between the final oxide coating and the fiber or the like seems to be improved.

If desired, the fibers provided with a refractory metal oxide coating to produce articles in accordance with the invention can previously have been coated with any organic binder or size, such as a synthetic resinous material, starch, mineral oil, or the like. Also, the appropriate metal salt or hydroxide can be dispersed in any suitable organic coating material, and the resulting dispersion applied to the fibers. In either case, the resulting product is one resistant to temperatures above the softening temperature of the vitreous substance to which the coatings are applied.

The following examples are presented solely for the purpose of further illustrating and disclosing the invention, and are in no way to be construed as limitations thereon.

EXAMPLE 1

Glass fibers were formed into a paper by standard techniques in commercial paper making apparatus. The paper was produced from fibers ¼ of a micron in diameter which had been pulped into lengths of about 1/100 to 1 inch. A sample of the paper was placed on a screen, and a 10 percent by weight solution of aluminum sulphate and water was poured thereover, and allowed to drain through the screen. The resulting impregnated glass fiber paper was air dried, and placed in the direct flame of a Fisher burner. Temperatures ⅛ of an inch below the paper, in contact with the flame side of the paper, in contact with the top side of the paper, ⅛ of an inch above the paper, and 1 inch above the paper were measured, and were found to be, respectively, 2190° F., 1890° F., 790° F., 360° F., and 250° F. The resulting paper was not burned through after 8 hours under such conditions. A second sample of the same paper was placed in a muffle furnace, supported between two surfaces separated by approximately two inches. The temperature in the muffle furnace was gradually increased, and the temperature at which the paper began to slump or sag between the two supporting surfaces, was ascertained to be about 1300° F. to 1350° F. The temperature of the furnace was increased still further until the paper actually fused at a temperature between about 1500° F. and 1550° F.

When, for purposes of comparison, but not in accordance with the invention a sample of paper identical except that it carried no coating was subjected to the same tests, it was found that the flame of a Fisher burner burned through the paper in approximately one minute, that the slump temperature was between 1100° F. and 1150° F., and that the fusing temperature was between 1100° F. and 1150° F. Similarly, when, for purposes of comparison, but not in accordance with the invention, samples of paper identical with that described in the preceding paragraph, except that they carried a coating of cadmium chloride, zinc chloride, barium chloride, lead acetate or cupric chloride, were subjected to the same tests the time for the paper to burn through in a Fisher flame, the slump temperature and the fusing temperature were found not to be appreciably different from those for paper that had not been treated in any way.

EXAMPLE 2

Samples of glass paper identical with that described in Example 1 were also impregnated in the described manner with salts of metals other than aluminum which are thermally convertible to refractory oxides, and tested in the described manner. The procedures employed, including solution concentrations, were identical with those described above except for the identity of the salts. The results of these tests are presented in Table I, below:

Table I

| Paper No. | Salt Impregnant | Measured Temperature, Flame Side | | Measured Temperature, Top Side | | | Time for Paper to Burn Through | Temperature Resistance | |
|---|---|---|---|---|---|---|---|---|---|
| | | 1/8″ Below Paper, °F. | In Contact With Paper, °F. | In Contact With Paper, °F. | 1/8″ Above Paper, °F. | 1″ Above Paper, °F. | | Slump Temp., °F. | Fusing Temp., °F. |
| 2 | CaAl₂O₄ | | | | | | More than 8 hours | 1,350–1,400 | 1,500–1,550 |
| 3 | MgCl₂ | 2,160 | 1,690 | 770 | 430 | 280 | ___do___ | 1,250–1,300 | 1,500–1,600 |
| 4 | TiOSO₄ | 2,190 | 2,120 | 370 | 390 | 240 | ___do___ | 1,300–1,350 | 1,500–1,550 |
| 5 | ZrCl₃ | 2,080 | 1,800 | 910 | 500 | 340 | ___do___ | 1,300–1,350 | 1,500 |

EXAMPLE 3

Samples of paper identical with that described in Example 1 were also impregnated with mixtures of salts, equal parts by weight, each convertible to a refractory metal oxide, and tested in the manner described in Example 1. The procedures used to impregnate the papers, including solution concentrations, and the testing procedures, were identical with those described except for the salts employed. The results of this series of tests are presented in Table II, below:

Table II

| Paper No. | Salt Impregnant | Measured Temperature, Flame Side | | Measured Temperature, Top Side | | | Time for Paper to Burn Through | Temperature Resistance | |
|---|---|---|---|---|---|---|---|---|---|
| | | 1/8″ Below Paper, °F. | In Contact With Paper, °F. | In Contact With Paper, °F. | 1/8″ Above Paper, °F. | 1″ Above Paper, °F. | | Slump Temp., °F. | Fusing Temp., °F. |
| 6 | CdCl₂+Al₂(SO₄)₃ | 1,980 | 1,780 | 630 | 390 | 320 | 6 hours | 1,300–1,350 | 1,500–1,550 |
| 7 | FeCl₃+Al₂(SO₄)₃ | 1,990 | 1,740 | 790 | 390 | 180 | More than 8 hours | 1,350–1,400 | 1,500–1,550 |
| 8 | MgCl₂+Al₂(SO₄)₃ | 2,100 | 1,890 | 880 | 430 | 302 | ___do___ | 1,350–1,400 | 1,500–1,550 |
| 9 | NiCl₂+Al₂(SO₄)₃ | 1,990 | 1,810 | 810 | 410 | 270 | ___do___ | 1,300–1,350 | 1,500–1,550 |
| 10 | TiOSO₄+Al₂(SO₄)₃ | 2,010 | 1,850 | 820 | 300 | 250 | ___do___ | 1,300–1,350 | 1,500–1,550 |
| 11 | ZnCl₂+Al₂(SO₄)₃ | 2,050 | 1,780 | 840 | 430 | 320 | ___do___ | 1,300–1,350 | 1,500–1,550 |

It will be observed that zinc chloride, alone, was ineffective at increasing the resistance to high temperatures of glass fibers or the like, but that a mixture of zinc chloride with aluminum sulphate was highly effective for this purpose.

EXAMPLE 4

Various samples of glass paper identical with that described in Example 1 were impregnated in the manner described with different appropriate salt solutions, and then, while still damp from the first impregnation, wet with a 14 to 28 percent by weight solution of ammonium hydroxide. These impregnated papers were then tested in the manner described in Example 1 for time to burn through in a Fisher flame, and temperature resistance. The results of these tests are presented in Table III, below:

Table III

| Paper No. | Salt Impregnant | Measured Temperature, Flame Side | | Measured Temperature, Top Side | | | Time for Paper to Burn Through | Temperature Resistance | |
|---|---|---|---|---|---|---|---|---|---|
| | | 1/8″ Below Paper, °F. | In Contact With Paper, °F. | In Contact with Paper, °F. | 1/8″ Above Paper, °F. | 1″ Above Paper, °F. | | Slump Temp., °F. | Fusing Temp., °F. |
| 12 | Al₂(SO₄)₃ | 2,050 | 1,770 | 860 | 430 | 300 | More than 8 hours | 1,300–1,350 | 1,500–1,550 |
| 13 | MgCl₂ | 1,990 | 1,560 | 930 | 390 | 250 | ___do___ | 1,400–1,450 | 1,500 |
| 14 | TiOSO₄ | 2,010 | 1,830 | 824 | 410 | 280 | ___do___ | 1,300–1,350 | 1,500 |
| 15 | ZrCl₃ | 2,030 | 1,800 | 880 | 450 | 302 | ___do___ | 1,150–1,200 | 1,500 |

EXAMPLE 5

Samples of glass fiber paper identical with that described in Example 1 were also treated in the described manner with aluminum sulphate solutions of varying concentration, with solutions of varying concentration made up of equal parts by weight of aluminum sulphate and magnesium chloride, and with aluminum sulphate solutions of varying concentration followed by subsequent treatment with ammonium hydroxide solutions. The various samples were weighed before treatment with the various salts, and after air drying. The gain in weight of each sample after treatment and drying, divided by the weight after such treatment and drying, was considered to be the weight fraction of coating, usually a hydroxide, thereon. In the case of the aluminum sulphate treatment it was found that paper samples carrying 50.3 percent by weight, 36.7 percent by weight, 28.1 percent by weight and 11.7 percent by weight of alumina did not burn through after 8 hours in the direct flame of a Fisher burner, while samples carrying only 3.0 percent by weight and 3.5 percent by weight melted through in such flame after 2 minutes. In the case of samples treated with aluminum sulphate and magnesium chloride, papers carrying 49 percent by weight, 25 percent by weight, 23 percent by weight, and 21 percent by weight of the coating did not burn through in 8 hours, but a sample carrying 7.8 percent by weight of the coating burned through in 3 minutes. It was found that the paper samples treated with aluminum sulphate followed by ammonium hydroxide carrying 21.8 percent by weight and 20.3 percent by weight of the coating did not burn through after 8 hours in the direct flame of a Fisher burner, while a sample where the coating constituted 16.0 percent by weight burned through in 6 hours, and a sample where the coating constituted 15.2 percent by weight burned through in 35 minutes.

It will be apparent that various changes and modifications can be made from the specific details discussed herein and shown in the examples without departing from the spirit of the attached claims.

This is a continuation-in-part of application Serial No. 371,161, entitled "Pressure Molded Cement Products and Methods for Producing Same," filed July 29, 1953, now U.S. Patent 2,793,130. The identified application discloses glass fibers coated with certain refractory metal oxides, and a method for producing same, and claims a method for producing pressure molded cementitious articles containing such fibers as reinforcement and the articles so produced.

What we claim is:

1. An article of manufacture comprising a mass of a vitreous substance having a maximum dimension in at least one direction not greater than 0.005 inch, and a coating comprising at least one refractory metal oxide having a pH not greater than 10.5 adhered to at least one surface of said mass, the refractory oxide content of said coating constituting at least about 10 percent of the weight of vitreous substance and coating.

2. An article of manufacture comprising a mass of a vitreous substance having a maximum dimension in at least one direction not greater than 0.005 inch, and a coating comprising at least one refractory metal oxide having a pH not greater than 10.5 adhered to at least one surface of said mass, the refractory oxide content of said coating constituting from about 10 percent to about 50 percent of the weight of vitreous substance and coating.

3. An article of manufacture comprising a mass of vitreous substance having a maximum dimension in at least one direction not greater than 0.005 inch, and a coating comprising a spinel composed of refractory metal oxides having a pH not greater than 10.5 adhered to at least one surface of said mass, the refractory oxide content of said coating constituting from about 10 percent to about 50 percent of the weight of vitreous substance and coating.

4. An article of manufacture comprising a mass of a vitreous substance having a maximum dimension in at least one direction not greater than 0.005 inch, and a coating comprising a plurality of refractory metal oxides all of which have a pH not greater than 10.5 adhered to at least one surface of said mass, the refractory oxide content of said coating constituting from about 10 percent to about 50 percent of the weight of vitreous substance and coating.

5. An article of manufacture comprising a mass of a vitreous substance having a maximum dimension in at least one direction not greater than 0.005 inch, and a coating comprising a plurality of spinel forming refractory metal oxides in spinel proportions, all of said oxides having a pH not greater than 10.5, adhered to at least one surface of said mass, the refractory oxide content of said coating constituting from about 10 percent to about 50 percent of the weight of vitreous substance and coating.

6. An article of manufacture comprising film glass having a maximum thickness not greater than 0.005 inch, and a coating comprising at least one refractory metal oxide having a pH not greater than 10.5 adhered to at least one surface of said film glass, the refractory oxide content of said coating constituting from about 10 percent to about 50 percent of the weight of the glass and coating.

7. An article of manufacture comprising a fiber of a vitreous substance, and a coating comprising at least one refractory metal oxide having a pH not greater than 10.5 adhered to the surface of the refractory oxide content of said fiber, said coating consituting from about 10 percent to about 50 percent of the weight of the vitreous substance and coating.

8. An article of manufacture comprising a mass of a vitreous substance having a maximum dimension in at least on direction not greater than 0.005 inch, and a substantially continuous coating comprising at least one refractory metal oxide having a pH not greater than 10.5 adhered to at least one surface of said mass, the refractory oxide content of said coating constituting from about 10 percent to about 50 percent of the weight of the vitreous substance and coating.

9. An article of manufacture comprising a mass of a vitreous substance having a maximum dimension in at least one direction not greater than 0.005 inch, and a substantially continuous coating comprising a least one gelatinous hydroxide convertible by heat to a refractory metal oxide having a pH not gerater than 10.5 adhered to at least one surface of said mass, the hydroxide content, calculated as the oxide, of said coating constituting from about 10 percent to about 50 percent of the weight of the vitreous substance and coating.

10. An article of manufacture as claimed in claim 1 wherein the coating on the mass of a vitreous substance is substantially completely free of any constituent other than a refractory metal oxide having a pH not greater than 10.5.

11. As an article of manufacture, a mass of a vitreous substance having a maximum dimension in at least one direction not greater than 0.005 inch, and a coating adhered to at least one surface of said mass, said coating comprising an inorganic material convertible upon firing to a refractory metal oxide, the inorganic material, calculated as the oxide, constituting from about 10 percent to about 50 percent of the weight of vitreous substance and refractory metal oxide and having a pH not greater than 10.5.

12. An article of manufacture as claimed in claim 11 wherein the vitreous substance carries a coating of an organic material intermediate its surface and the inorganic coating.

13. An article of manufacture as claimed in claim 11 wherein the inorganic coating is carried as a dispersed phase in an organic coating.

14. An article of manufacture comprising a mass of a vitreous substance having a maximum dimension in at least one direction not greater than 0.005 inch, and a coating comprising aluminum oxide adhered to at least one surface of said mass, the aluminum oxide in said coating constituting from about 10 percent to about 50 percent of the weight of vitreous substance and coating.

15. An article of manufacture comprising a mass of a vitreous substance having a maximum dimension in at least on direction not greater than 0.005 inch, and a coating comprising zirconia adhered to at least one surface of said mass the zirconia in, said coating constituting from about 10 percent to about 50 percent of the weight of vitreous substance and coating.

16. An article of manufacture comprising a mass of a vitreous substance having a maximum dimension in at least one direction not greater than 0.005 inch, and a coating comprising iron oxide adhered to at least one surface of said mass, the iron oxide in said coating constituting from about 10 percent to about 50 percent of the weight of vitreous substance and coating.

17. An article of manufacture comprising a mass of a vitreous substance having a maximum dimension in at least one direction not greater than 0.005 inch, and a coating comprising calcium aluminate adhered to at least one surface of said mass, the calcium aluminate in said coating constituting from about 10 percent to about 50 percent of the weight of vitreous substance and coating.

References Cited in the file of this patent

UNITED STATES PATENTS

| | | |
|---|---|---|
| 2,451,805 | Callinan | Oct. 19, 1948 |
| 2,593,818 | Waggoner | Apr. 22, 1952 |
| 2,608,499 | Straka | Aug. 26, 1952 |
| 2,692,220 | Labino | Oct. 19, 1954 |
| 2,699,415 | Nachtman | Jan. 11, 1955 |
| 2,710,289 | Smith-Johannsen | June 7, 1955 |
| 2,762,168 | McCutchen | Sept. 11, 1956 |